US007824643B2

(12) United States Patent
Schumacher et al.

(10) Patent No.: US 7,824,643 B2
(45) Date of Patent: Nov. 2, 2010

(54) SILICON DIOXIDE DISPERSION

(75) Inventors: Kai Schumacher, Hofheim (DE);
Monika Oswald, Hanau (DE)

(73) Assignee: Evonik Degussa GmbH, Essen (DE)

( * ) Notice: Subject to any disclaimer, the term of this patent is extended or adjusted under 35 U.S.C. 154(b) by 1162 days.

(21) Appl. No.: 10/524,037

(22) PCT Filed: Jul. 29, 2003

(86) PCT No.: PCT/EP03/08332
§ 371 (c)(1),
(2), (4) Date: Feb. 9, 2005

(87) PCT Pub. No.: WO2004/020334
PCT Pub. Date: Mar. 11, 2004

(65) Prior Publication Data
US 2006/0093542 A1  May 4, 2006

(30) Foreign Application Priority Data
Aug. 27, 2002 (DE) .................. 102 39 144

(51) Int. Cl.
*C01B 33/12* (2006.01)
*C01B 33/18* (2006.01)

(52) U.S. Cl. .............. 423/335; 423/336; 423/337; 427/219

(58) Field of Classification Search ......... 423/335–337; 427/219
See application file for complete search history.

(56) References Cited
U.S. PATENT DOCUMENTS
5,609,675 A * 3/1997 Noritake et al. ............ 106/35

| 5,623,028 | A | * | 4/1997 | Fitzgerald et al. ........... 525/474 |
| 6,027,669 | A | | 2/2000 | Miura et al. |
| 6,328,944 | B1 | * | 12/2001 | Mangold et al. ............. 423/278 |
| 6,423,331 | B1 | * | 7/2002 | Mangold et al. ............. 424/421 |
| 2001/0011105 | A1 | | 8/2001 | Noguchi et al. |
| 2004/0253164 | A1 | | 12/2004 | Mangold et al. |

FOREIGN PATENT DOCUMENTS

| DE | 3851013 T2 | 8/1994 |
| EP | 0 272 904 | 6/1988 |
| EP | 0 850 876 | 7/1998 |
| JP | 09-002812 | 1/1997 |
| JP | 9-110415 | 4/1997 |
| JP | 2001-326261 | 11/2001 |
| JP | 2002-121323 | 4/2002 |
| RU | 2 152 903 | 7/2000 |

OTHER PUBLICATIONS

Satu Ek, Andrew Root, Marko Peussa, Lauri Niinisto, "Determination of the hydroxyl group content in silica by thermogravimetry and a comparison with 1H MAS NMR results", Thermochimica Acta 379 (2001), pp. 201-212.*

(Continued)

*Primary Examiner*—Stanley Silverman
*Assistant Examiner*—Diana J Liao
(74) *Attorney, Agent, or Firm*—Oblon, Spivak, McClelland, Maier & Neustadt, L.L.P.

(57) ABSTRACT

Stable, aqueous dispersion containing silicon dioxide powder having a hydroxyl group density of 2.5 to 4.7 $OH/nm^2$, which is obtained from a silicon dioxide powder produced by a flame hydrolysis process under acid conditions. The dispersion is produced by incorporating the silicon dioxide powder into an aqueous solution by means of a dispersing device. The dispersion can be used to produce glass articles.

27 Claims, 1 Drawing Sheet

OTHER PUBLICATIONS

Figure 1B:
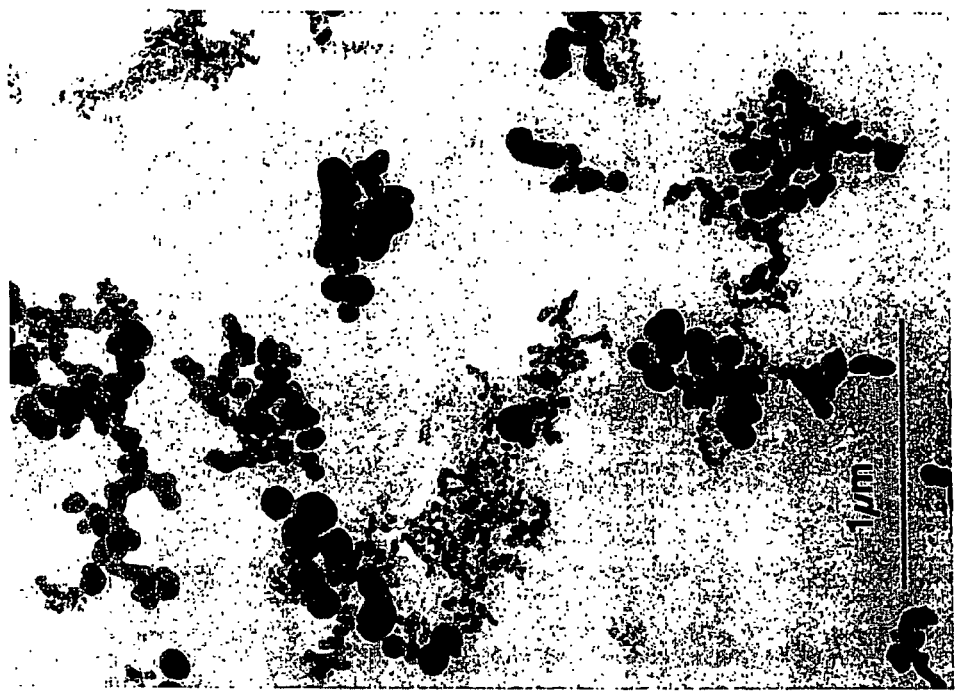

Roger Mueller, Hendrik K. Kammler, Karsten Wegner, and Sotiris E Pratsinis, "OH Surface Density of SiO2 and TiO2 by Thermogravimetric Analysis" Langmuir 19 (2003), pp. 160-165.*

Hendrik K. Kammler, Roger Mueller, Omri Senn, and Sotiris E. Pratsinis, "Synthesis of Silica-Carbon Particles in a Turbulent H2-Air Flame Aerosol Reactor" AIChE Journal, vol. 47 No. 7 (Jul. 2001), pp. 1533-1543.*

Humbert, B. "Estimation of hydroxyl density at the surface of pyrogenic silicas by complementary NMR and Raman experiments", Journal of Non-Crystalline Solids, vol. 191, pp. 29-37, XP004076467 1995.

Clark-Monks, Colin et al. "The Characterization of Anomalous Adsorption Sites on Silica Surfaces", Journal of Colloid and Interface Science, vol. 44, No. 1, pp. 37-49, XP008024718 1973.

U.S. Appl. No. 11/055,605, filed Feb. 11, 2005, Schumacher, et al.
U.S. Appl. No. 10/530,284, filed Apr. 5, 2005, Moerters, et al.
U.S. Appl. No. 10/530,491, filed Apr. 6, 2005, Moerters, et al.
U.S. Appl. No. 11/084,022, filed Mar. 21, 2005, Schumacher, et al.
U.S. Appl. No. 11/084,170, filed Mar. 21, 2005, Schumacher, et al.
U.S. Appl. No. 11/085,151, filed Mar. 22, 2005, Schumacher, et al.

R. Bode, et al.; "Grundlagen und Anwendungen einer durch Flammenhydrolyse gewonnenen Kieselsaure"; Kautschuk und Gummi Kunststofee 20. lahrgang. Nr.; Oct. 1967, pp. 578-586.

R. Bode, et al., Principles and Applications of a Silica Produced by Flame Hydrolysis, pp. 1-28 (submitting English translation only).

U.S. Appl. No. 10/549,929, filed Sep. 20, 2005, Schumacher, et al.

Johann Mathias, et al., "Basic Characteristics and Applications of Aerosil", 30. The Chemistry and Physics of the Aerosil Surface, Journal of Colloid and Interface Science, vol. 125, No. 1, Sep. 1988, pp. 61-68.

* cited by examiner

SILICON DIOXIDE DISPERSION

The invention concerns silicon dioxide dispersions, their production and use.

Aqueous silicon dioxide dispersions are used in polishing applications (CMP), in the paper sector (inkjet) or in glass production.

For economic and applicational reasons, the use of dispersions having a high content of silicon dioxide powder is desirable here. Economic can refer for example to the reduction of costs by transporting more highly filled dispersions. Such a dispersion can then be diluted to the desired content on site.

Furthermore, special applications demand highly filled dispersions. This applies for example to the production of glass articles. An aqueous silicon dioxide dispersion can be converted first of all into a green body which by means of further heat treatment, optionally with subsequent sintering, is converted into a glass body. The use of a highly filled dispersion reduces shrinkage during production of the green body and minimises cracking.

It is known from U.S. Pat. No. 4,042,361 that aqueous dispersions containing silicon dioxide produced by a flame hydrolysis process and no stabilisers display an acceptable stability only up to a fill content of up to 30 wt. %. With higher fill contents gelation or sedimentation can occur within a very short time.

U.S. Pat. No. 5,116,535 describes a process for producing a stable, aqueous dispersion containing at least 35 wt. % of silicon dioxide produced by a flame hydrolysis process and likewise no stabilisers. In this process silicon dioxide is introduced into water in a quantity that initially leads to a higher concentration in the dispersion than is desired. In a second step this predispersion is diluted with water to the desired concentration. The higher fill content achieved in comparison to U.S. Pat. No. 4,042,361 results from the higher viscosity of the predispersion, which increases the efficiency of dispersion. The disadvantage is that production of the dispersion involves two steps, and because of the high viscosity of the predispersion high dispersion energies are necessary.

U.S. Pat. No. 5,246,624 describes the production of a stabilised dispersion wherein silicon dioxide is introduced into acidified water in a concentration that is higher than desired. Acidification is preferably performed with mineral acids. The subsequent addition of base leads to a stabilisation of the dispersions in the alkaline pH range and the dispersion can be diluted to the desired concentration.

The disadvantage here is that production has to be started in the acid range. During the subsequent addition of base, the neutralisation causes salts to form, which can cause a disadvantageous change in the rheological properties of the dispersion.

The object of the invention is to provide a silicon dioxide powder that can be incorporated into aqueous dispersions with high fill contents. The object of the invention is further to provide a dispersion containing this silicon dioxide powder which can be used as an alternative to dispersions containing silicon dioxide obtained from flame hydrolysis processes, without displaying their disadvantages.

The invention provides silicon dioxide powder that is characterised in that it is a silicon dioxide powder produced by flame hydrolysis and displaying a hydroxyl group density of 2.5 to 4.7 $OH/nm^2$.

It is produced by treating silicon dioxide powder produced by flame hydrolysis under acid conditions.

Flame hydrolysis according to the invention refers to the formation of silicon dioxide by flame hydrolysis of at least one evaporable, silicon-containing compound in the gas phase of a flame. The flame is generated by the reaction of a hydrogen-containing fuel gas and an oxygen-containing gas. During this reaction water is formed in the form of water vapour, which leads to a hydrolysis of the silicon-containing compound with formation of silicon dioxide. As is explained by J. Mathias and G. Wannemacher, Journal of Colloid and Interface Science 125 (1988), the surface of the untreated silicon dioxide powder produced by flame hydrolysis displays a hydroxyl group density of approx. 1.8 to 2.5 $OH/nm^2$. Even if additional water vapour is charged into the process, as described for example in DE-A-1150955, the hydroxyl group density remains within this range.

During flame hydrolysis highly disperse, non-porous primary particles are initially formed which, as the reaction continues, can coalesce to form aggregates, and these can congregate further to form agglomerates.

Suitable silicon-containing compounds are for example silicon tetrachloride, methyl trichlorosilane, ethyl trichlorosilane, propyl trichlorosilane, dimethyl dichlorosilane and mixtures thereof. Silicon tetrachloride is particularly preferred. Suitable fuel gases are hydrogen, methane, ethane, propane, with hydrogen being particularly preferred. The preferred oxygen-containing gas is air.

It is known from U.S. Pat. No. 5,256,386 that silicon dioxide particles produced by means of the sol-gel method, which are highly porous, spherical and non-aggregated, can be treated with acids to increase the hydroxyl group density.

The increase in the hydroxyl group density of a silicon dioxide powder produced by flame hydrolysis, which takes the form of aggregates of non-porous primary particles, achieved by treatment under acid conditions is surprising.

An increased formation of agglomerates of silicon dioxide with loss of fine-particle structures would have been expected. The consequence of such structural changes would be that a powder treated in this way would no longer be suitable for many applications.

The person skilled in the art would not have considered a treatment under acid conditions as a means of increasing the hydroxyl group density of a silicon dioxide powder produced by flame hydrolysis, since it is known that in a flame hydrolysis process water vapour is present at many points and yet the powder obtained from the process only displays a hydroxyl group density of less than 2.5 $OH/nm^2$.

The silicon dioxide powder according to the invention can be incorporated into aqueous media substantially faster than untreated silicon dioxide powder produced by flame hydrolysis.

Silicon dioxide powders produced by flame hydrolysis also include such powders that in addition to the silicon dioxide display a doping component. The production of such powders is described in DE-A-19650500. Typical doping components are for example aluminium, potassium, sodium or lithium. The content of doping component should be no more than 1 wt. %.

Silicon dioxide powders produced by flame hydrolysis also additionally include silicon-metal mixed oxide powders produced by flame hydrolysis, wherein the content of silicon dioxide is at least 60%.

In a preferred embodiment the hydroxyl group density of the silicon dioxide powder can be between 3 and 4 $OH/nm^2$.

The BET surface area of the silicon dioxide powder can be between 5 and 600 $m^2/g$. It can preferably be between 20 and 200 $m^2/g$.

The invention also provides a process for producing the silicon dioxide powder according to the invention, which is characterised in that a silicon dioxide powder produced by a flame hydrolysis process and having a hydroxyl group density of less than 2.5 OH/nm$^2$ is treated at temperatures of 40 to 700° C. under acid conditions and for reaction times of 5 minutes to 20 hours and is subsequently separated from the reaction mixture.

Acid conditions refer to aqueous acids. Inorganic mineral acids such as e.g. hydrochloric acid, sulfuric acid or water-miscible carboxylic acids can be used in particular.

The treatment can preferably be performed with aqueous hydrochloric acid. An embodiment can likewise be preferred wherein the acid residues, generally hydrochloric acid, from the production process adhere to the silicon dioxide powder produced by flame hydrolysis.

The reaction times vary with the reaction temperature and with the nature and quantity of the acid involved in the reaction.

The silicon dioxide powder according to the invention can be obtained directly in a step following on from the process. A step following on from the process refers to processing stages following the deacidification stage. A simplified flow diagram of the known process is reproduced for example in Ullmann's Encylopedia of Industrial Chemistry, Vol. A23, page 636, 5$^{th}$ edition.

The invention also provides an aqueous dispersion containing the silicon dioxide powder according to the invention.

An embodiment wherein the dispersion according to the invention does not thicken and forms no sediment for a period of at least 6 months can be preferred.

The content of silicon dioxide in the dispersion according to the invention can vary over broad ranges. Dispersions according to the invention can be obtained with a content of 10 to 70 wt. %. The range between 20 and 60 wt. % is preferred, the range between 30 and 50 wt. % being particularly preferred.

The pH of the dispersion according to the invention can be in a range between 3 and 12. In the acid environment ranges between 3 and 6 are preferred, the range between 4 and 5 being particularly preferred. In the alkali environment the ranges between 8.5 and 12 are preferred, the range between 9 and 10.5 being particularly preferred.

The pH of the dispersion can be adjusted using acids or bases if necessary. Both inorganic and organic acids can be used as acids. Examples of inorganic acids are hydrochloric acid, nitric acid or sulfuric acid. Examples of organic acids are carboxylic acids having the general formula $C_nH_{2n+1}CO_2H$, where n=0-6, dicarboxylic acids having the general formula $HO_2C(CH_2)_nCO_2H$, where n=0-4, or hydroxycarboxylic acids having the general formula $R_1R_2C(OH)CO_2H$, where $R_1$=H, $R_2$=CH$_3$, CH$_2$CO$_2$H, CH(OH)CO$_2$H or glycolic acid, pyruvic acid, salicylic acid or mixtures of the cited acids. Particularly preferred organic acids can be acetic acid, citric acid and salicylic acid.

Alkali hydroxides, amines or ammonia can be used to raise the pH. Ammonium hydroxide, potassium hydroxide and tetramethyl ammonium hydroxide can be particularly preferred.

Irrespective thereof, acids or bases can be added to the dispersion according to the invention to establish a desired pH.

The average aggregate diameter of the silicon dioxide powder in the dispersion according to the invention can be less than 200 nm and particularly preferably less than 100 nm. The average aggregate diameter in the dispersion can be determined by dynamic light scattering. Dispersions with such fine-particle silicon dioxide can be used for polishing surfaces.

The dispersion according to the invention can also contain oxidising agent. The content of oxidising agent can be between 0.3 and 20 wt. %, relative to the dispersion. Typical oxidising agents can be hydrogen peroxide, hydrogen peroxide adducts or organic per-acids.

The dispersion according to the invention can also contain corrosion inhibitors. The content of corrosion inhibitors can be 0.001 to 2 wt. %, relative to the dispersion. Suitable examples of corrosion inhibitors can be benzotriazole, substituted benzimidazoles, substituted pyrazines, substituted pyrazoles and mixtures thereof.

Surface-active substances, which can be of a non-ionic, cationic, anionic or amphoteric nature, can be added to further stabilise the dispersion according to the invention, for example against sedimentation, flocculation and decomposition of additives. The content of surface-active substances can be 0.001 to 10 wt. %, relative to the dispersion.

The invention also provides a process for producing the dispersion according to the invention which is characterised in that a silicon dioxide powder produced by flame hydrolysis and having a hydroxyl group density of 2.5 to 4.7 OH/nm$^2$ is incorporated into an aqueous solution by means of a dispersing device.

High-speed mixers, a toothed disc, rotor-stator machines, ball mills or attrition mills, for example, are suitable for incorporating the silicon dioxide powder. Higher energy inputs are possible with a planetary kneader/mixer. The efficiency of this system depends on a sufficiently high viscosity of the mixture to be processed, however, in order for the high shear energies needed to break down the particles to be introduced. Aqueous dispersions having average aggregate sizes of below 0.1 μm can be obtained with high-pressure homogenisers.

In these devices two predispersed streams of suspension under high pressure are decompressed through a nozzle. The two jets of dispersion hit each other exactly and the particles grind themselves.

In another embodiment the predispersion can again be placed under high pressure, but the particles collide against armoured sections of wall. The operation can be repeated any number of times to obtain smaller particle sizes.

The invention also provides the use of the dispersion according to the invention for the production of transparent coatings, for chemical mechanical polishing, for glass production, for the production of sol-gel glass articles, for example overcladdings, crucibles, accessories, coatings, sintered materials, inkjet papers.

EXAMPLES

Analytical Chemistry

The BET surface area of the particles is determined according to DIN 66131.

The hydroxyl group density is determined by the method published by J. Mathias and G. Wannemacher in Journal of Colloid and Interface Science 125 (1988) by reaction with lithium aluminium hydride.

The viscosity is determined with a Brookfield viscometer at 23 degrees C.

The loss on drying (LOD) is determined at 105° C./2 hours by reference to DIN/ISO 787/II, ASTM D 280, JIS K 5101/21.

Production of Silicon Dioxide Powders (P)

Example PA1

700 g silicon dioxide powder (OX 50, Degussa) are refluxed in 2100 g water and 2100 g hydrochloric acid (37%) for 18 h. The powder is then removed from the product by filtration and washed with water until a pH of 5 is obtained.

Example PA2

Performed in the same way as Example PA1 but without hydrochloric acid.

Example PB1

Performed in the same way as Example PA1 but with Aerosil 90 (Degussa AG) instead of OX 50.

Example PB2

Performed in the same way as Example PB1 but without hydrochloric acid.

Example PC1

Performed in the same way as Example PA1 but with Aerosil 200 (Degussa AG) instead of OX 50.

Example PC2

Performed in the same way as Example PC1 but without hydrochloric acid.

Example PD1

K-doped $SiO_2$ powder, produced according to DE-A-19650500, with water vapour being introduced after the deacidification zone.

Example PE1

Performed in the same way as Example PD1 but with Na-doped $SiO_2$ powder produced according to DE-A-19650500.

Example PF1

Performed in the same way as Example PD1 but with Li-doped $SiO_2$ powder produced according to DE-A-19650500.

Figure 1A:
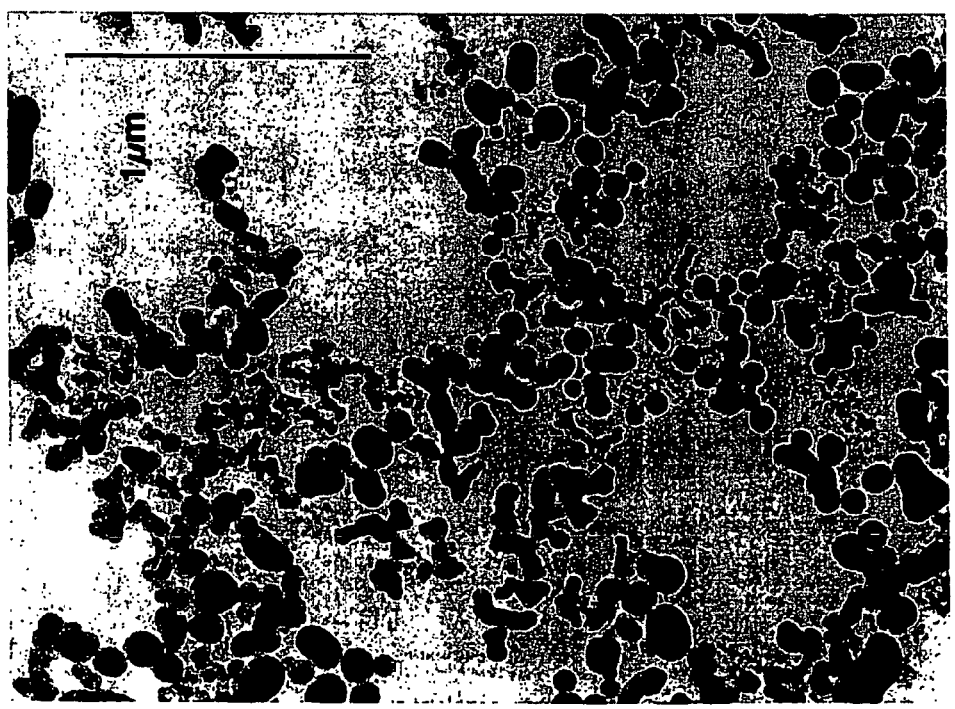

Comparative materials bear the index 0 and are untreated samples. The analytical data for the treated and untreated silicon dioxide powders is reproduced in the table. The table shows that the treatment according to the invention of silicon dioxide produced by a flame hydrolysis process under acid conditions results in a markedly increased hydroxyl group density, whilst the BET surface area of the treated and untreated powders remains unchanged within the limits of determination accuracy. Further evidence that the treatment according to the invention causes no substantial changes in the structure of the powder is provided by the transmission electron micrographs in FIGS. 1A and 1B. FIG. 1A shows the powder according to the invention from Example PA1, FIG. 1B shows the untreated powder from Example PA0.

TABLE

Analytical data for silicon dioxide powders

| Example | Starting material | Treatment | Reaction time [h] | Temperature [° C.] | BET [m$^2$/g] | OH density [OH/nm$^2$] | LOD [wt. %] |
|---|---|---|---|---|---|---|---|
| PA0 | OX 50 | None | — | — | 40 | 2.3 | 0.6 |
| PA1 | OX 50 | HCl/H$_2$O | 18 | 100 | 40 | 4.6 | 0.51 |
| PA2 | OX 50 | H$_2$O | 18 | 100 | 41 | 4.7 | 0.58 |
| PB0 | AE 90 | None | — | — | 84 | 2.4 | 0.8 |
| PB1 | AE 90 | HCl/H$_2$O | 18 | 100 | 80 | 4.7 | 1 |
| PB2 | AE 90 | H$_2$O | 18 | 100 | 85 | 5.4 | 0.9 |
| PC0 | AE 200 | None | — | — | 198 | 2.1 | 0.9 |
| PC1 | AE 200 | HCl/H$_2$O | 18 | 100 | 197 | 3.7 | 0.8 |
| PC2 | AE 200 | H$_2$O | 18 | 100 | 200 | 3.8 | 2.2 |
| PD0 | K/SiO$_2$[(1)] | None | — | — | 132 | 1.8 | 0.5 |
| PD1 | K/SiO$_2$ | Steam | 0.1 | 550 | 130 | 2.8 | 0.7 |
| PE0 | Na/SiO$_2$ | None | — | — | 89 | 1.9 | 0.6 |
| PE1 | Na/SiO$_2$ | Steam | 0.1 | 550 | 90 | 2.6 | 0.6 |
| PF0 | Li/SiO$_2$ | None | — | — | 88 | 2.1 | 0.5 |
| PF1 | Li/SiO$_2$ | Steam | 0.1 | 550 | 91 | 2.7 | 0.6 |

[(1)]All doped powders with 0.2 wt. % doping component

Production of Dispersions (D)

Example D1

56 g of the powder from Example PA1 are stirred into 44 g water using an Ultra-Turrax. A fill content of 56 wt. % is obtained. After 4 days a viscosity of 110 mPas is achieved with a shear rate of 10 rpm. The dispersion is unchanged after a storage period of 6 months at room temperature.

Example D2 (Comparative Example)

Using the same dispersing device as in Example D1, a maximum of 30 wt. % of the powder from Example PA0 can be stirred in. The dispersion thickens further and becomes solid after approx. 4 weeks. The viscosity measured after four days was 500 mPas at a shear rate of 10 rpm.

Example D3

Same as Example D1 but with the powder from Example PC1 instead of PA1. The result is a fill content of 28 wt. %, the viscosity was 140 mPas at a shear rate of 10 rpm.

Example D4 (Comparative Example)

Same as Example D1 but with powder from Example PC0. The result is a maximum fill content of 15 wt. % and a viscosity of 350 mPas at a shear rate of 10 rpm.

Example D5

56 g of the powder from Example PA1 are incorporated into 44 g water using an Ultra-Turrax. The pH is then adjusted to 10.5 with 1N KOH. A fill content of 53 wt. % is obtained.

Example D6

20 kg of powder PB1 are absorbed into 20 kg of demineralised water with the aid of a dispersing and suction mixer from Ystrahl (at 4500 rpm) and roughly predispersed. Following introduction of the powder, dispersion is completed at a speed of 11,500 rpm. The dispersion thus obtained is ground with a high-pressure homogeniser, Ultimaizer system from Sugino Machine Ltd., model HJP-25050, at a pressure of 250 MPa and with a diamond die diameter of 0.3 mm and two grinding cycles. A fill content of 50 wt. % is obtained. The average particle diameter (number related) determined with a Zetasizer 3000 Hsa from Malvern is 92 nm.

Dispersions D1, D3 and D5 and D6 display no sediment within 6 months.

The invention claimed is:

1. A silicon dioxide powder, produced by flame hydrolysis followed by acid treatment, and displaying a hydroxyl group density of 3 to 4.7 OH/nm$^2$, wherein the hydroxyl group density is determined by reaction of the silicon dioxide powder with lithium aluminum hydride according to the method of J. Mathias and G. Wannemacher in Journal of Colloid and Interface Science 125 (1988) 61; and the silicon dioxide powder is a doped silicon dioxide powder.

2. The silicon dioxide powder according to claim 1, wherein the hydroxyl group density in the silicon dioxide powder is between 3 and 4 OH/nm$^2$.

3. The silicon dioxide powder according to claim 1, wherein the BET surface area of the silicon dioxide powder is between 5 and 600 m$^2$/g.

4. A process for producing the silicon dioxide powder according to claim 1, comprising treating a silicon dioxide powder, produced by a flame hydrolysis process and having a hydroxyl group density of less than 2.5 OH/nm$^2$, at temperatures of 40 to 700° C., under acid conditions, and for reaction times of 5 minutes to 20 hours, to form a reaction mixture, and subsequently separating the treated powder from the reaction mixture.

5. The process according to claim 4, wherein inorganic or organic acids are used for the treatment.

6. An aqueous dispersion, comprising the silicon dioxide powder according to claim 1, and water.

7. The aqueous dispersion according to claim 6, wherein said dispersion, over a period of 6 months, does not thicken further and forms no sediment.

8. The aqueous dispersion according to claim 6, wherein said dispersion has a content of silicon dioxide powder between 10 and 70 wt. %.

9. The aqueous dispersion according to claim 6, wherein said dispersion has a pH between 3 and 12.

10. The aqueous dispersion according to claim 6, wherein the average aggregate diameter in the dispersion is less than 200 nm.

11. The aqueous dispersion according to claim 6, wherein said dispersion contains oxidising agents, corrosion inhibitors and/or surface-active substances.

12. A process for producing the dispersion according to claim 6, comprising incorporating a silicon dioxide powder, having a hydroxyl group density of 3 to 4.7 OH/nm$^2$, obtained from a silicon dioxide powder produced by flame hydrolysis, into an aqueous solution by means of a dispersing device.

13. A method of producing a transparent coating, comprising applying the dispersion of claim 6 to a substrate.

14. A method of producing a chemical mechanical polishing, comprising contacting the dispersion of claim 6 with one or more polishing additives.

15. A method of producing glass, comprising contacting the dispersion of claim 6 with one or more additives for glass manufacturing.

16. A method of producing a sol-gel glass article, comprising contacting the dispersion of claim 6 with one or more additives for sol-gel glass article manufacturing.

17. The silicon dioxide powder according to claim 1, wherein the acid treatment is with an aqueous acid.

18. The silicon dioxide powder according to claim 1, wherein the acid is an inorganic mineral acid or a water-miscible carboxylic acid.

19. The silicon dioxide powder according to claim 1, wherein the acid is aqueous hydrochloric acid.

20. The silicon dioxide powder according to claim 1, wherein an acid residue from the production process adhere to the silicon dioxide powder produced by flame hydrolysis.

21. A silicon dioxide powder, produced by flame hydrolysis followed by acid treatment, and displaying a hydroxyl group density of 3 to 4.7 OH/nm$^2$, wherein the hydroxyl group density is determined by reaction of the silicon dioxide powder with lithium aluminum hydride according to the method of J. Mathias and G. Wannemacher in Journal of Colloid and Interface Science 125 (1988) 61.

22. The silicon dioxide powder according to claim 21, wherein the hydroxyl group density in the silicon dioxide powder is between 3 and 4 $OH/nm^2$.

23. The silicon dioxide powder according to claim 21, wherein the BET surface area of the silicon dioxide powder is between 5 and 600 $m^2/g$.

24. The silicon dioxide powder according to claim 21, wherein the acid treatment is with an aqueous acid.

25. The silicon dioxide powder according to claim 21, wherein the acid is an inorganic mineral acid or a water-miscible carboxylic acid.

26. The silicon dioxide powder according to claim 21, wherein the acid is aqueous hydrochloric acid.

27. The silicon dioxide powder according to claim 21, wherein an acid residue from the production process adhere to the silicon dioxide powder produced by flame hydrolysis.

* * * * *